US007440936B2

(12) United States Patent
Mori

(10) Patent No.: US 7,440,936 B2
(45) Date of Patent: Oct. 21, 2008

(54) METHOD FOR DETERMINING AN ACCESS MODE TO A DATASET

(75) Inventor: Shigeko Mori, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 10/960,531

(22) Filed: Oct. 7, 2004

(65) Prior Publication Data

US 2006/0080270 A1   Apr. 13, 2006

(51) Int. Cl.
G06F 17/30 (2006.01)
(52) U.S. Cl. .......................................... 707/2; 707/101
(58) Field of Classification Search ................. 707/101, 707/2
See application file for complete search history.

(56) References Cited

U.S. PATENT DOCUMENTS

| 5,283,894 | A | * | 2/1994 | Deran | 707/1 |
| 5,761,667 | A | * | 6/1998 | Koeppen | 707/101 |
| 5,881,379 | A | * | 3/1999 | Beier et al. | 707/101 |
| 5,933,820 | A | | 8/1999 | Beier et al. | 707/1 |
| 5,940,819 | A | * | 8/1999 | Beavin et al. | 707/2 |
| 6,873,989 | B1 | * | 3/2005 | Martin, Jr. | 707/101 |
| 2003/0014585 | A1 | * | 1/2003 | Ji | 711/112 |
| 2003/0046294 | A1 | * | 3/2003 | Heronimus | 707/100 |
| 2004/0006561 | A1 | * | 1/2004 | Nica | 707/3 |
| 2005/0102295 | A1 | * | 5/2005 | Murray et al. | 707/100 |

OTHER PUBLICATIONS

Severance et al. "A Practical Approach to Selecting Record Access Paths", Computing Surveys, vol. 9, No. 4, Dec. 1977.*
Yao et al. "A Dynamic Database Reorganization Algorithm" ACM Transactions on Database System, vol. 1, No. 2, Jun. 1976, p. 159-174.*
Behymer et al. "Analysis of Indexd Sequential and Direct Access File Organization" ACM Press, May 1974.*

* cited by examiner

Primary Examiner—Charles Rones
Assistant Examiner—Yuk Ting Choi
(74) Attorney, Agent, or Firm—Lieberman & Brandsdorfer, LLC

(57) ABSTRACT

A method and system are provided for identifying and selecting an optimal access method for reading an ILDS. A counter is associated with a pointer and identifies the number of times a database partition has been reorganized. Based upon a comparison of the counter from the pointer with a second counter from a second pointer, the optimal access method is determined. Since the comparison of pointers is conducted without reading the ILDS, the optimal access method is determined prior to reading the ILDS, which improves pointer checking performance. A direct access method may be selected if the access rate is lower than a predetermining threshold value, a sequential access method may be selected if the access rate is higher than a predetermined threshold value, and a skip sequential access method may be selected if the access rate is within a predetermined value.

8 Claims, 7 Drawing Sheets

METHOD FOR DETERMINING AN ACCESS MODE TO A DATASET

BACKGROUND OF THE INVENTION

1. Technical Field

This invention relates to pointer checking in a database. More specifically, the invention relates to selecting an optimal record access method prior to opening any files.

2. Description of the Prior Art

Periodically databases need to be reorganized. This is generally due to that fact that databases tend to grow in an uneven manner resulting in a disorganized system with a commensurate degradation in performance. Reorganization of a database includes changing aspects of the logical and/or physical arrangement of the database. Over a period of usage, database management systems (DBMS) will require reorganization in order to restore database performance levels and maximize database capacity. During most types of reorganization, the area being reorganized is typically offline and unavailable to users. The data reorganization activity may result in data remaining unavailable for a substantial interval (i.e. hours or more). Therefore, it is desirable to reduce the amount of time the database is unavailable by reducing the number of steps involved in a database reorganization operation, and more specifically to reduce the number of steps involved in reorganizing a hierarchical database.

A hierarchical database management system, such an IBM's IMS DL/I (IMS) manages data in a tree structure. Each data element is called a segment. The first data element is called the root segment of the structure. The root segment is the top of the tree and each subordinate segment is a child of the root or is a child of the child of the root segment or is a child further descended down from the root segment of the tree. One database is analogous to a forest containing many trees all of which share the same defined segment structure.

IMS also utilizes keyed access directly to any segment in the database. Keyed access is provided through an index file containing pointers directed to the segments in the database. The use of the index allows for the locating of a desired element through the index as opposed to a sequential searching through a collection of elements. Indexing data by using direct pointers to data elements is common in databases managed by DBMS. It is well known in the art that a segment which otherwise can be pointed to directly, can also be pointed to indirectly through an index. However, indexing data is usually the result of a user defining the data for which an index is used, either beforehand or dynamically.

One difficulty in managing hierarchical data is that logical relationships may exist between data elements in the same database or between specific data elements in different databases. As such, direct pointing between data segments in the same or different databases is managed through a relative byte address (RBA). Each segment has direct pointers consisting of RBA to which a segment points. When the logical relationship among multiple databases is defined, an application program can access the databases as one database. When a secondary database is defined with an index, an application program can access the indexed database faster than without the indexing. Accordingly, direct pointers are used to maintain the logical relationship among databases.

A feature of the IMS provides the ability to partition each database thereby increasing storage capacity and improving availability. Each partition in the database may be separately reorganized when needed. During the reorganization of a partition, the RBA of a segment may be relocated. However, the direct pointer associated with the segment residing in a different database not subject to reorganization is not updated. To resolve this problem, an indirect pointer and reorganization number is provided. The reorganization number is the count of the number of times the partition has been reorganized. The indirect pointer contains the current RBA of the pointed segment. The indirect pointer is an intermediate pointer from the direct pointer to the current segment RBA. The direct pointer is related to the indirect pointer by an Indirect List Key (ILK). When a segment is inserted to a partition, the ILK is formed from the RBA of that segment, the current partition identifier, and the current partition reorganization number. As a result, the partitioned segment relies on the use of an ILK for various purposes.

The indirect pointers are stored in a file known as an Indirect List Data Set (ILDS), which is a key sequenced data set. A data element in the ILDS is named as in Indirect List Element (ILE). The ILE consists of the ILK, partition identifier, the reorganization number, and the indirect pointer. There is one ILE for every segment involved in inter-record pointing. The ILEs are created or updated during a database reorganization and kept at the current values. The direct pointer is stored in an extended pointer set (EPS), which is part of the segment prefix. The EPS consists of the identifiers of the pointing segment, which are the partition identifiers, the reorganization number of the partition, the direct pointer, and the ILK. It should be noted, the EPS could have an older reorganization number than the current reorganization number since the EPS is not updated during reorganization.

After a reorganization, IMS compares the reorganization number in the EPS with the current reorganization number in the partition. If the two reorganization numbers are the same, the direct pointer contains the current value of the reorganization number and the IMS does not need to refer to the ILE. However, if the two reorganization numbers differ, the IMS refers to the ILE for the current reorganization number and the segment RBA, and updates the EPS to the current value.

The ILDS is a key sequenced data set of a virtual storage access method. There are three categories of methods for accessing a key sequenced data set: sequential, direct, and skip-sequential. Generally, satisfactory performance can be obtained by using the sequential access method to access a large quantity of records sequentially. Similarly, direct access generally provides satisfactory performance for accessing random keys, and skip sequential access generally provides satisfactory performance for accessing portions of records sequentially.

As shown herein, the IMS contains many types of pointers in order to support the relationships among data sets. In order to maintain database integrity, the pointers of the database need to be validated. A pointer checker performs the pointer checking. It executes separated from the IMS. The pointer checker reads all segments in source databases and target databases, and validates the consistency of each pointer value and an associated segment RBA. The pointer checker also refers to the ILDS to check for the direct pointer, the indirect pointer, and the segment RBA in the same manner as the IMS. The prior art pointer checker cannot select the optimum access method for the ILDS before opening the ILDS, as such there is no established method for estimating an optimum access method to the ILDS without first reading the ILDS. Therefore, the pointer checker defaults to a sequential access method to read the ILDS as it lacks a method of determining an optimal access method without first accessing the ILDS.

During the pointer check process, a target partition cannot be reorganized because the ILDS must be static. However, as the database changes, so do the number of reference ILEs. As a result, selection of an optimal access method can significantly decrease the time associated with ILDS access. Therefore, there is a need to identify an optimal access method before reading the ILDS to improve pointer checking performance.

SUMMARY OF THE INVENTION

This invention comprises selecting an optimal access method to a dataset.

In one aspect of the invention, a method is provided for accessing a dataset. A first counter in a first database is maintained. The counter identifies the number of times the first database has been reorganized. A set of counters in a set of databases pointing to the first database is also maintained. Each of the counters in the set of counters identifies a number of times an associated database has been reorganized. In addition, a maximum value among the first counter and the set of counters is determined. An access rate for the dataset is calculated based upon the total number of data records in the dataset and a quantity of counters having a counter value less than the maximum value. Thereafter, an access method to the dataset is selected based upon the calculated access rate.

In another aspect of the invention, a method is provided for accessing at least one dataset. A counter is maintained in each partition of a first database. The counter identifies a number of times each partition has been reorganized. A set of counters in a set of databases pointing to the first database is also maintained. Each counter in the set of counters is maintained for each partition in one of the database. In addition, each counter in the set of counters identifies a number of times the associated partition has been reorganized. For each partition, a maximum value among the first counter and the set of counters is determined. In addition, for each partition, an access rate to a dataset corresponding to each partition is calculated. The access rate is based on a total number of data records in the dataset and the number of counters having counter values less than the maximum value. An access rate for each partition to the dataset is selected based upon the calculated access rate.

In yet another aspect of the invention, an article is provided in a computer-readable signal-bearing medium. Means in the medium are provided for maintaining a first counter in a first database. The first counter identifies a number of times the first database has been reorganized. Means in the medium are also provided for maintaining a set of counters in a set of databases pointing to the first database. Each of the counters in the set of counters identifiers a number of times an associated database has been reorganized. Means in the medium are provided for determining a maximum value among the first counter and the set of counters. Based on a total number of data records in the dataset and a quantity of counters having a counter value less than the maximum value, means in the medium for calculating an access rate to a dataset. Finally, means in the medium are provided for selecting an access method to a dataset based upon the calculated access rate.

In a further aspect of the invention, an article is provided in a computer-readable signal bearing medium. Means in the medium are provided for maintaining a counter in each partition of a first database. The counter identifies a number of times each partition has been reorganized. In addition, means in the medium are provided for maintaining a set of counters in a set of databases pointing to the first database. Each counter in the set of counters is maintained for each associated partition in one of the databases and identifies a number of times the associated partition has been reorganized. Means in the medium are also provided for determining for each partition a maximum value among the first counter and the set of counters. For each partition, means in the medium for calculating an access rate to a dataset. The access rate is based on a total number of data records in the dataset and the number of counters having counter values less than the maximum value. Finally means in the medium are provided for selecting an access method for each partition to the dataset based upon the calculated access rate.

Other features and advantages of this invention will become apparent from the following detailed description of the presently preferred embodiment of the invention, taken in conjunction with the accompanying drawings.

DESCRIPTION OF THE PREFERRED EMBODIMENT

Technical Details

Figure 1:
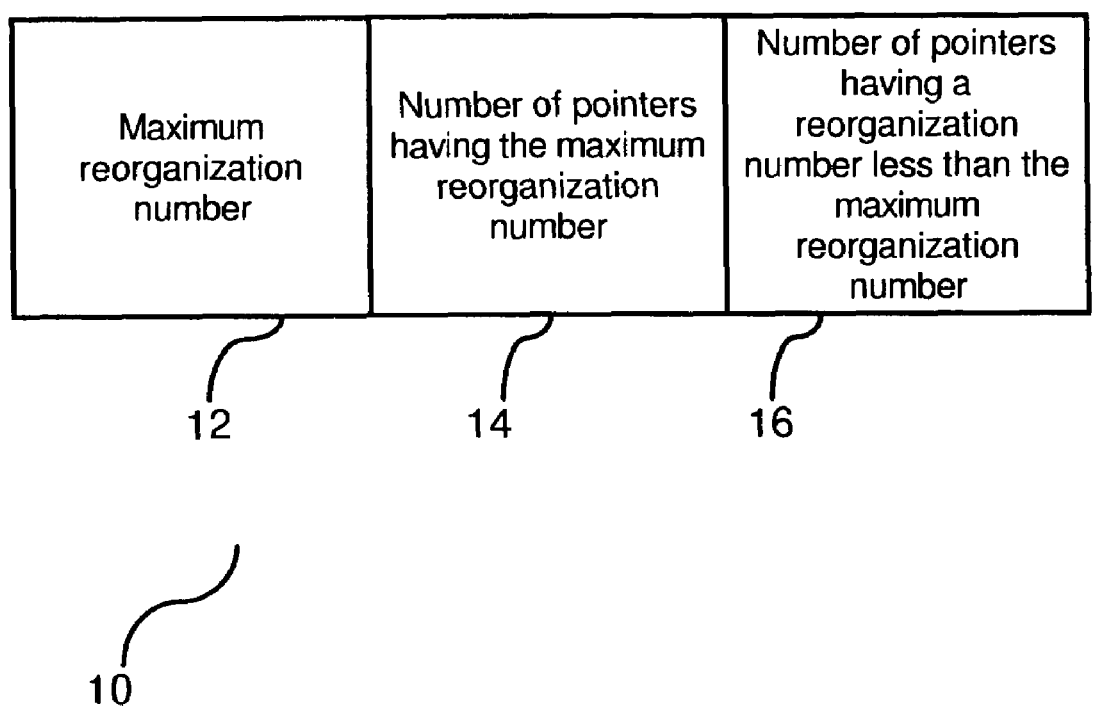
FIG. 1 is a block diagram of a reorganization table for a single partition.

A table is compiled to organize information from a source database, i.e. a database which contains source partitions. FIG. 1 shows a diagram of one form of the table (10). There are three columns shown in this formative of the table (10). The first column (12) stores a maximum reorganization number from the pointer information. The pointer information is the EPS stored in each segment that contains the pointer, also known as a source segment. The reorganization number identifies the number of times the partition which contains the target segment(s), i.e. the target partition, has been reorganized. Similarly, the maximum reorganization number column (12) is intended to determine the maximum reorganization number in the source segments. The second column (14) stores the number of pointers having the maximum reorganization number. The third column (16) stores the number of pointers having a reorganization number less than the maximum reorganization number.

Figure 2:
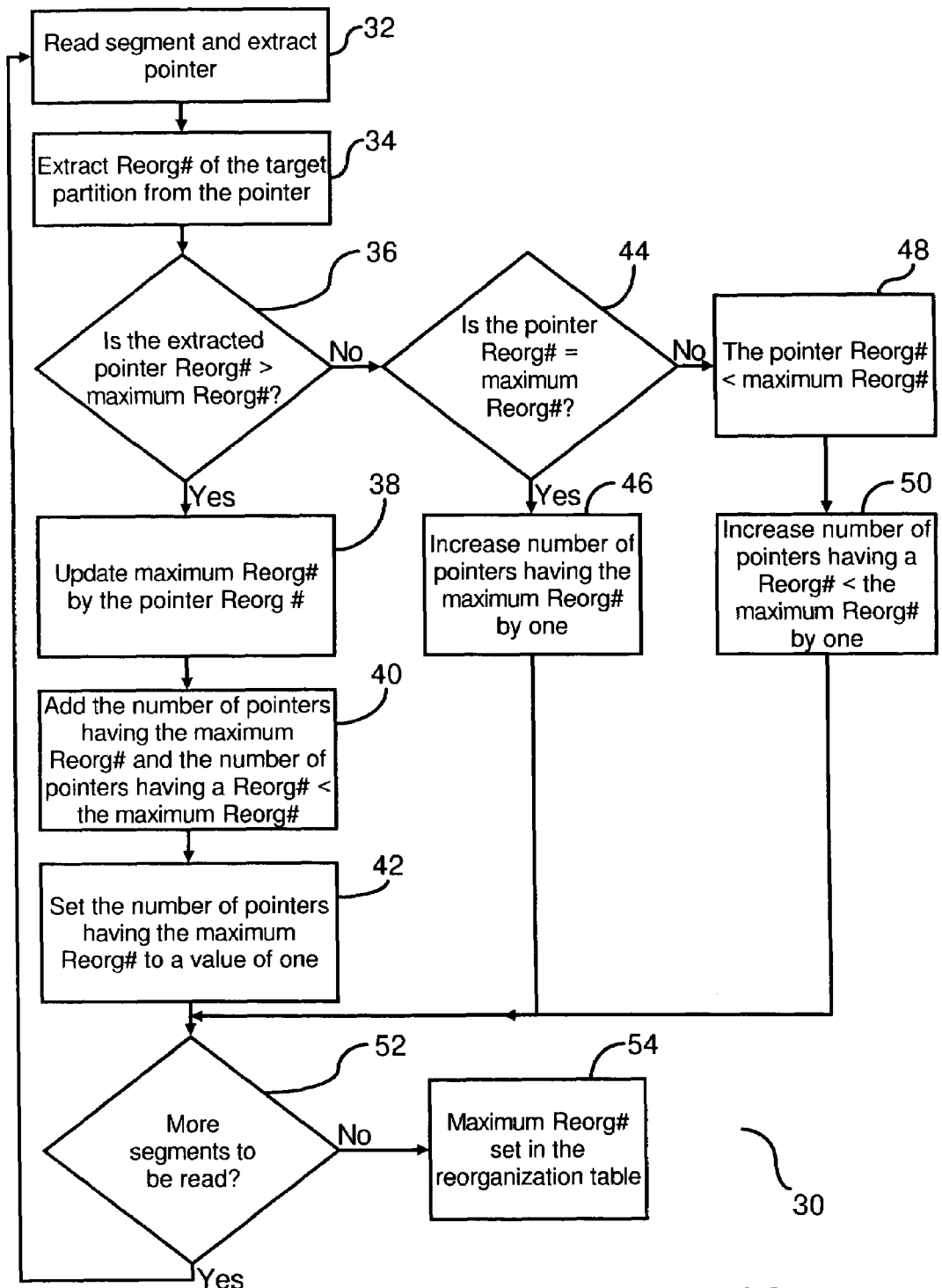
FIG. 2 is a flow chart illustrating a process for determining a maximum reorganization number in a single partition.

Prior to comparing a dataset from a source database to a database which contains the target segments, i.e. the target partition, a pointer checker scans the source database to find the maximum reorganization number in the pointer information in the source segments. FIG. 2 is a flow chart (30) illustrating a process for counting the number of pointers and the maximum reorganization number in the pointer information extracted from the source database. A data segment is read, and associated pointer information is extracted from the segment (32). The reorganization number of the target partition is extracted from the pointer (34). Thereafter, a test is conducted to determine if the reorganization number extracted from the pointer at step (34) is greater than the maximum reorganization number (36). The maximum reorganization number is found at column (12) in the table shown in FIG. 1. A positive response to the test at step (36) is an indication that the table (10) needs to be updated. The maximum reorganization number at (12) is updated to reflect the value of the maximum reorganization number of the pointer (38). Thereafter, the number of pointers having a reorganization number less than the maximum reorganization number is updated (40) as the sum of the number of pointers having the maximum reorganization number and the number of pointers having a reorganization number less than the maximum reorganization number. That is, the number of pointers with the reorganization number less than the maximum reorganization number is changed to be the sum of the values at (14) and (16). In addition, the number of pointers with the maximum reorganization number at (14) is set to a value of one (42). However, a negative response to the test at step (36), will result in a subsequent test to determine if the reorganization number extracted from the pointer of the read segment at step (34) is equal to the maximum reorganization number (44). A positive response to this test (44) will result in increasing the value in the reorganization table (10) identifying the number of pointers having the maximum reorganization number (14) by a value of one (46). However, a negative response to the test at step (44) is an indication that the reorganization number of the segment read at step (32) is less than the maximum reorganization number (48). The number of pointers having a reorganization number less than the maximum reorganization number (16) is increased by an integer of one (50). Following steps (42), (46), and (50), a subsequent test is conducted to determine if there is additional source segment to be read (52). A positive response to the test at step (52) will return to step (32). However, a negative response to the test at step (52), is an indication that the pointer information from the source database has been obtained and accurate values have been read and/or updated in the reorganization table (54). Accordingly, the process of reading the source segments enables the reorganization table to accurately reflect the status of the pointers in the source database.

Figure 3:
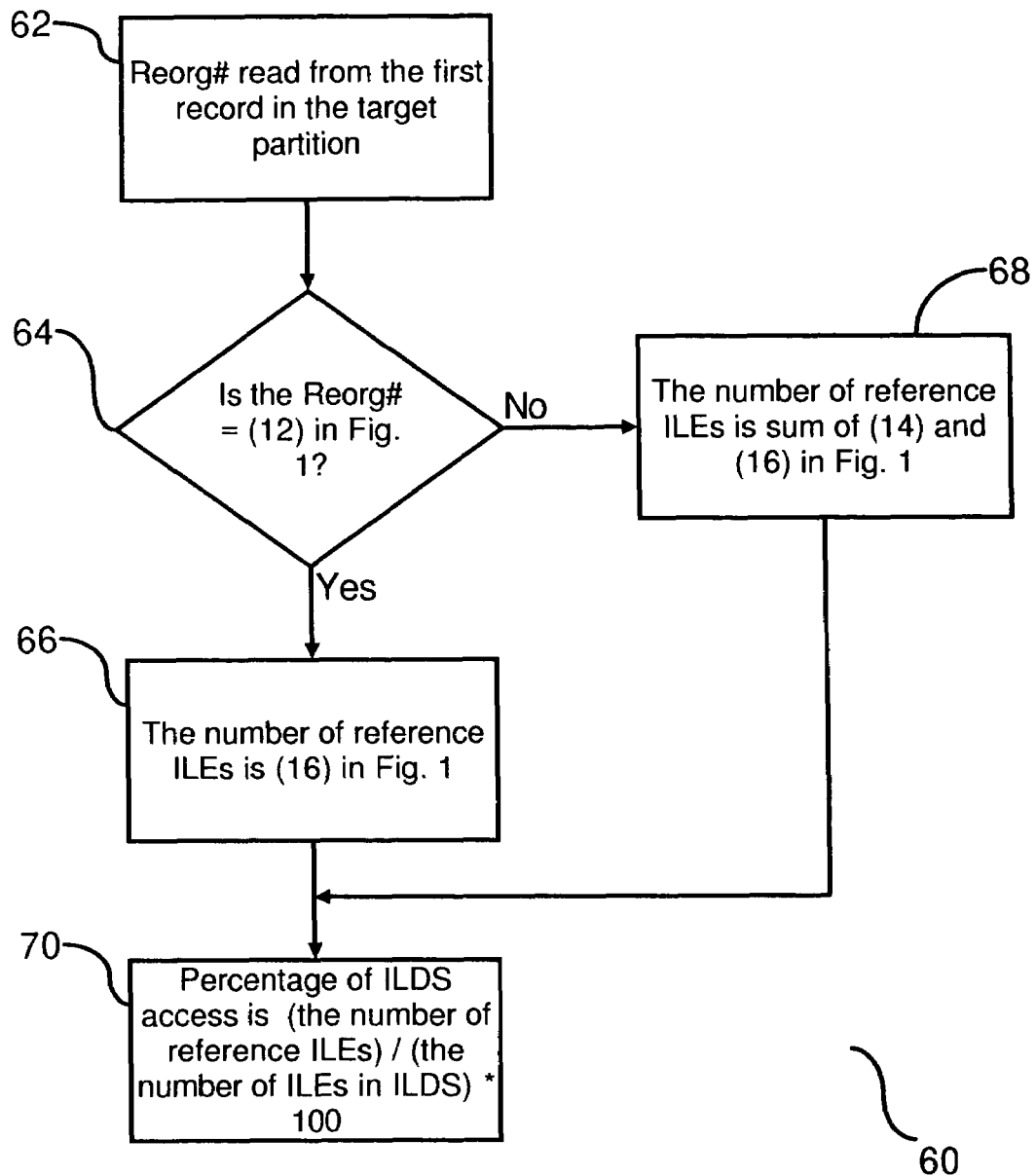
FIG. 3 is a flow chart illustrating a process for selecting an optimal access mode in a single partition.

Concurrently, with the process of updating the reorganization table, the extracted pointer information (32) is gathered and sorted in the key sequence of ILDS. Following the process of updating the reorganization table and sorting the extracted pointer information, an optimal method for accessing a dataset may be initiated. FIG. 3 is a flow chart (60) illustrating a process for selecting an optimal access method to the dataset. The reorganization number is read from the first record in the target partition (62), i.e. a partition which contains the target segments. Thereafter, a test (64) is conducted to determine if the number from step (62) is the same as the number in the first column of the reorganization table (12) of FIG. 1. A positive response to the test at step (64) indicates that the maximum reorganization number is the current reorganization number of the target partition. Thus, the pointers having the maximum reorganization number contain the current pointer value. Therefore, the pointers having the reorganization number less than the maximum reorganization number need to refer the corresponding ILE to get the current pointer value. This will result in assigning the value in the third column (16) of FIG. 1 to be the number of reference ILEs (66). However, a negative response to the test at step (64) indicates that any pointer does not have the current reorganization number. This will result in assigning the value of the sum of the second and third columns, (14) and (16) respectively, of the reorganization table (10) to be the number of reference ILEs (68). Following the assignment at either step (66) or step (68), the percentage ratio of the reference records is calculated (70) with the following formula:

[(Number of reference ILEs)/(Total number of ILEs in the ILDS)]*100

Figure 4:
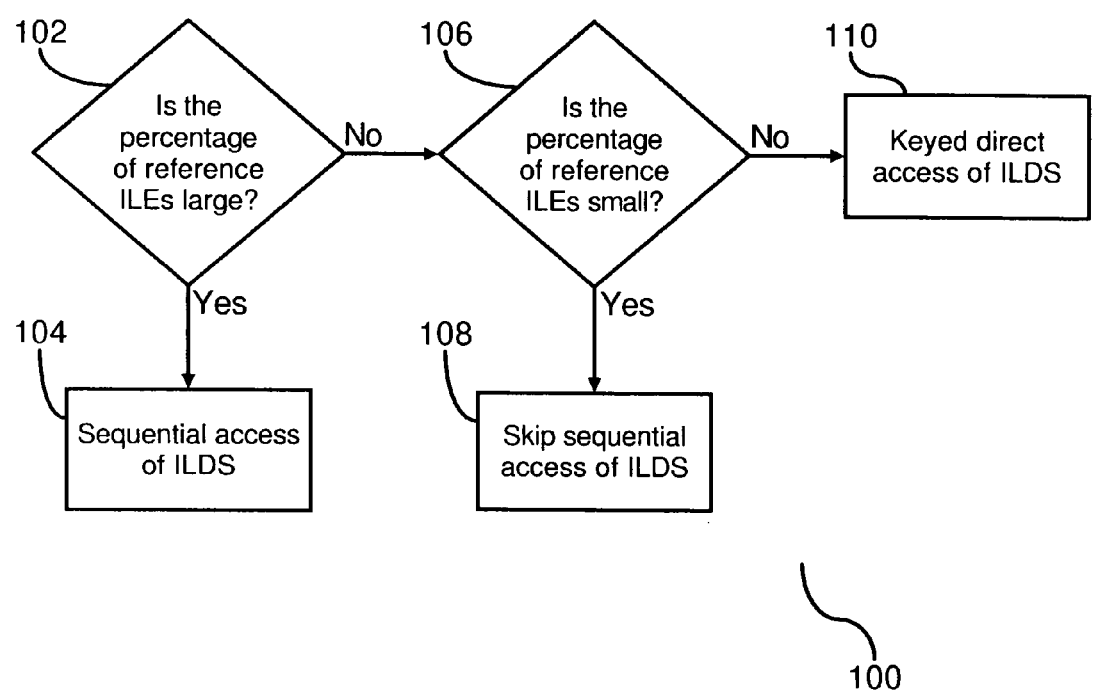
FIG. 4 is a flow chart illustrating a process for assigning an access mode of the ILDS in a single partition.

Based upon the percentage ratio calculated at step (70), an optimal method for accessing the ILDS is shown in flow chart (100) of FIG. 4. A test is conducted to determine if the percentage ratio of reference records is large (102). A positive response to the test at step (102), will result in an assignment of a sequential access of the ILDS (104). However, a negative response to the test at step (102) will result in a subsequent test to determine if the percentage ratio of reference records is small (106). A positive response to the test at step (106), will result in an assignment of a skip sequential access of the ILDS (108). Similarly, a negative response to the test at step (106), will result in a determination that the percentage ratio of reference records is very small and an assignment of a keyed direct access of the ILDS will take place (110). In one embodiment, a ratio greater than 5% would generally warrant selection of a sequential access method, a ratio between 0.5% and 5% would generally warrant selection of a skip sequential access method, and a ratio between 0 and 0.5% would generally warrant selection of a direct access method. The ratios provided herein together with the recommended access methods may be modified depending upon the number of records and the number of buffers, wherein the buffer is an area used for reading the ILDS.

Figure 5:
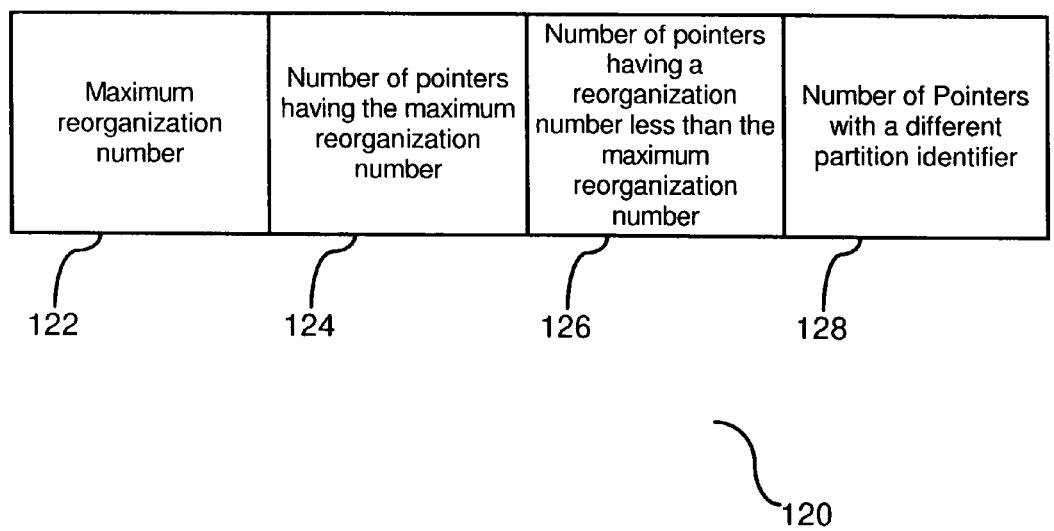
FIG. 5 is a block diagram of a reorganization table for multiple partitions.

The methods for determining an optimal access method shown in FIGS. 2 and 3 are designed for a target database in one partition. In the pointer checking process, more than one target partition can be processed. For example, when multiple partitions are reorganized at once, the target segments can be moved to a different partition from where it originated. To manage segment relocation across partitions, a fourth field may be added to the reorganization table. FIG. 5 is a diagram (120) illustrating the reorganization table modified to undertake two or more partitions. As shown, there are now four columns. The first column (122) stores the maximum reorganization number from the pointer information. The pointer information is the EPS stored in each source segment. The second column (124) stores the number of pointers having the maximum reorganization number. The third column (126) stores the number of pointers having a reorganization number less than the maximum reorganization number. The fourth column (128) stores the number of pointers with a different partition identifier. The reorganization table shown herein is defined for every target partition identifier.

Figure 6:
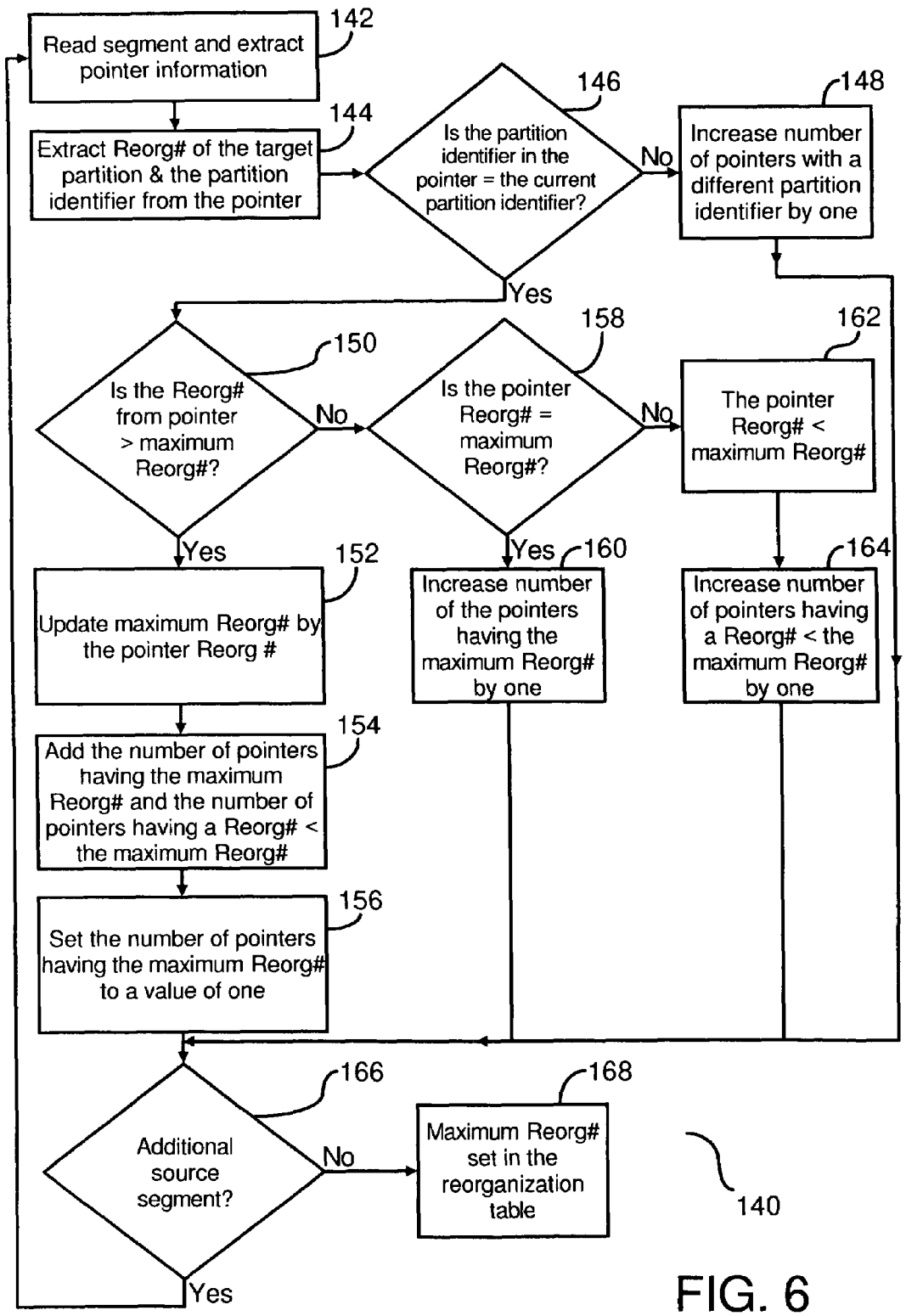
FIG. 6 is a flow chart illustrating a process for determining a maximum reorganization number for multiple partitions.

Prior to comparing a dataset from a source database to one or more target partitions, the pointer checker scans the source database to find the maximum reorganization number in the pointer information in the source segment(s). FIG. 6 is a flow chart (140) illustrating a process for counting the number of pointers and the maximum value among the associated reorganization numbers. A data segment is read and associated pointer information is extracted from the segment (142). A reorganization number of a target partition and a partition identifier of the target partition are both extracted from the pointer information (144). Additionally, the partition identifier in which the target segment currently resides in is determined. In the following steps, the process refers to a reorganization table associated with the partition identifier in which the target segment currently resides. A test is conducted to determine if the partition identifier of the pointer is the same as the current partition identifier (146). A negative response to the test at step (146) will result in incrementing the number of pointers with different partition identifiers by an integer of one (148). Alternatively, a positive response to the test at step (146) will result in a subsequent test to determine if the reorganization number extracted from the pointer at step (144) is greater than the maximum reorganization number (150). The maximum reorganization number is found at (122) in table (120) shown in FIG. 5. A positive response to the test at step (150), is an indication that the table needs to be updated. The maximum reorganization number (122) is updated to reflect the value of the maximum reorganization number of the pointer (152). Thereafter, the number of pointers having a reorganization number less than the maximum reorganization number (126) is updated (154) as the sum of the values at (124) and (126). That is, the number of pointers having a reorganization number less than the maximum reorganization number (126) is changed to be the sum of the values at (124) and (126). In addition, the number of pointers with the maximum reorganization number at (124) is set to a value of one (156). However, a negative response to the test at step (150), will result in a subsequent test to determine if the reorganization number extracted from the pointer of the segment at step (144) is equal to the maximum reorganization number (158). A positive response to this test (158) will result in an increase in the value in the reorganization table identifying the number of pointers with the maximum reorganization number (124) by an integer of one (160). However, a negative response to the test at step (158) is an indication that the reorganization number extracted from pointer information of the segment at step (144) is less than the maximum reorganization number (162). The number of pointers having a reorganization number less than the maximum reorganization number (126) is increased by an integer of one (164). Following steps (148), (156), (160), and (164), a subsequent test is conducted to determine if there is additional source segment to be read (166). A positive response to the test at step (166) will return to step (142). However, a negative response to the test at step (166), is an indication that the pointer information from the source database has been obtained and accurate values have been read and/or updated in the reorganization table (168). Accordingly, the process of reading the source segment(s) enables the reorganization table(s) to be updated to accurately reflect the status of the pointers in the source database.

Figure 7:
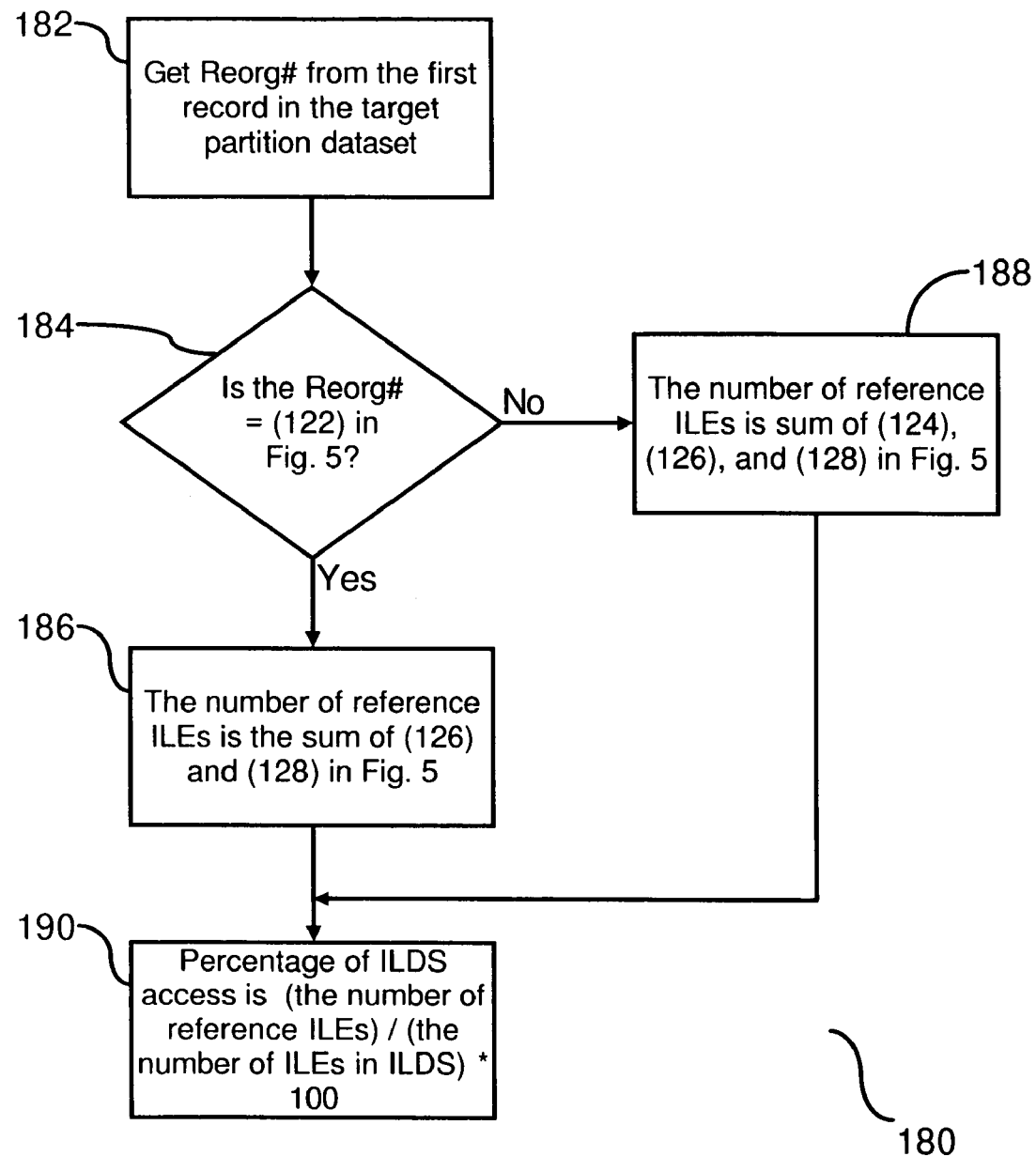
FIG. 7 is a flow chart illustrating a process for selecting an optimal access mode for multiple partitions according to the preferred embodiment of this invention, and is suggested for printing on the first page of the issued patent.

Concurrently with the process of updating the reorganization table shown in FIG. 6, the extracted pointer information (144) is gathered by the current target partition identifier and sorted in the key sequence of ILDS. Following the process of updating the reorganization table and sorting the extracted pointer information, an optimal method for accessing a dataset may be initiated. FIG. 7 is a flow chart (180) illustrating a process for selecting an optimal access method to an ILDS associated with a reorganization table for a target partition. The maximum reorganization number is read from the first record of the target partition dataset (182). Thereafter, a test is conducted to determine if the number from step (184) is the same as the number in the first column of the reorganization table (122) obtained at step (166) of FIG. 6. A positive response to the test at step (184) indicates that the maximum reorganization number is the current reorganization number of the target partition. Thus, the pointers having the maximum reorganization number contain the current pointer value. Therefore, the pointers having the reorganization number less than the maximum reorganization number need to refer to the corresponding ILE to get the current pointer value. This results in assigning the number of reference ILEs (186) as the sum of the values in the third and fourth columns (126) and (128), respectively, of the table (120). However, a negative response to the test at step (184) indicates that any pointer does not have the current reorganization number. This results in assigning the number of reference ILEs (188) as the sum of the values in the second, third, and fourth columns (124), (126), and (128), respectively, of the table (120), i.e. the number of pointers with different partition identifier (128) is added to the number of reference ILEs. The pointers having the different partition identifier indicate that they are relocated from a partition other than the current partition. Thus, these pointers need to refer to the corresponding ILE to get the current pointer value.

Following the assignment at steps (186) or (188), the percentage ratio (190) of the reference ILEs is calculated with the following formula:

[(Number of reference ILEs)/(Total number of ILEs in the ILDS)]*100

Based upon the percentage ratio calculated at step (190), an optimal method for accessing the ILDS is determined in the same manner as shown in flow chart (100) of FIG. 4. Accordingly, an optimal ILDS access method may be selected to incorporate multiple segments from multiple partitions.

Advantages Over the Prior Art

The provision of estimating the ratio of the number of reference ILEs to the total number of ILEs in the ILDS for a single partition or a multiple partition environment enables the pointer checker to determine the rate of accessing records prior to opening the ILDS. The process of selecting an optimal method for reading the ILDS prior to opening improves operating efficiency of the dataset.

Alternative Embodiments

It will be appreciated that, although specific embodiments of the invention have been described herein for purposes of illustration, various modifications may be made without departing from the spirit and scope of the invention. In particular, an alternate method may be employed if it is known during the scan process that the target partition has never been reorganized. The alternate process for determining an optimal access mode is to obtain the current reorganization identifier from the target partition at the beginning of the scan process of the source database(s). The scan process extracts the pointer information only when the partition identifier or the reorganization identifier are different from the target value. This process is valid and effective for reducing the number of times the system must extract pointer information. In another embodiment, a user specified parameter may be provided to select the logic to be employed in determining an optimal access mode. Accordingly, the scope of protection of this invention is limited only by the following claims and their equivalents.

I claim:

1. A computer implemented method for accessing a dataset comprising:
   determining a maximum reorganization number among pointers in a first database;
   determining a first number of pointers in said first database having a reorganization number equal to said maximum reorganization number;
   determining a second number of pointers in said first database having a reorganization number less than said maximum reorganization number;

extracting a reorganization number of a first record in a target database;

calculating a number of reference ILEs (indirect list entries) in an associated ILDS (indirect list data set); said number of reference ILEs based on a relationship among said first number of pointers, said second number of pointers, and said reorganization number of the first record in the target database;

calculating a ratio of said number of reference record ILEs to a total number of records in the associated ILDS;

selecting an access method to the dataset based upon said calculated ratio and prior to opening the ILDS, including selecting a direct access method if the ratio is lower than a predetermining threshold value; selecting a sequential access method if the ratio is higher than a predetermined threshold value; and using the selected access method to access the dataset.

2. The method of claim 1, further comprising selecting a skip sequential access method if the ratio is within a predetermined value.

3. The method of claim 1, wherein the number of reference ILEs in the ILDS equals the second number of pointers when the reorganization number of the first record in the target database equals the maximum reorganization number.

4. The method of claim 1, wherein the number of reference ILEs in the associated ILDS equals the sum of the first and second number of pointers when the reorganization number of the first record in the target database is less than the maximum reorganization number.

5. An article comprising:
a computer-readable recordable data storage medium;
means in the medium for determining a maximum reorganization number among pointers in a first database;
means in the medium for determining a first number of pointers in said first database having a reorganization number equal to said maximum reorganization number;
means in the medium for determining a second number of pointers in said first database having a reorganization number less than said maximum reorganization number;
means in the medium for extracting a reorganization number of a first record in a target database;
means in the medium for calculating a number of reference ILEs (indirect list entries) in an associated ILDS (indirect list data set); said number of reference ILEs based on a relationship among said first number of pointers, said second number of pointers, and said reorganization number of the first record in the target database;
means in the medium for calculating a ratio of said number of reference record ILEs to a total number of records in the associated ILDS;
means in the medium for selecting an access method to the dataset based upon said calculated ratio and prior to opening the ILDS, including selecting a direct access method if the ratio is lower than a predetermining threshold value and selecting a sequential access method if the ratio is higher than a predetermined threshold value; and using the selected access method to access the dataset.

6. The article of claim 5, further comprising means in the medium for selecting a skip sequential access method if the ratio is within a predetermined value.

7. The article of claim 5, wherein the number of reference ILEs in the ILDS equals the second number of pointers when the reorganization number of the first record in the target database equals the maximum reorganization number.

8. The article of claim 5, wherein the number of reference ILEs in the associated ILDS equals the sum of the first and second number of pointers when the reorganization number of the first record in the target database is less than the maximum reorganization number.

\* \* \* \* \*